United States Patent [19]
McMurray

[11] 3,726,478
[45] Apr. 10, 1973

[54] MOVING PIVOT SPRINKLER IRRIGATION SYSTEM

[75] Inventor: David C. McMurray, Milwaukee, Wis.

[73] Assignee: Irrigation and Power Equipment Inc., Greeley, Colo.

[22] Filed: Mar. 29, 1971

[21] Appl. No.: 129,015

[52] U.S. Cl. .................239/212, 239/180, 137/344
[51] Int. Cl. ...........................A01g 25/02, B05b 3/18
[58] Field of Search......................239/178, 179, 180, 239/181, 184, 212; 137/344

[56] References Cited

UNITED STATES PATENTS

| | | | |
|---|---|---|---|
| 2,726,895 | 12/1955 | Behlen | 239/181 X |
| 2,628,863 | 2/1953 | Maggart | 239/179 |
| 2,807,500 | 9/1957 | Clayton | 239/180 |
| 3,009,645 | 11/1961 | Nugent | 239/179 |

FOREIGN PATENTS OR APPLICATIONS

| | | | |
|---|---|---|---|
| 276 | 1/1906 | Great Britain | 239/180 |
| 20,942 | 11/1919 | France | 239/179 |
| 444,551 | 11/1921 | Germany | 239/179 |

Primary Examiner—Robert S. Ward, Jr.
Attorney—Andrus, Sceales, Starke & Sawall

[57] ABSTRACT

An irrigation sprinkler pipe with sprinkler stations spaced longitudinally therealong is mounted on individually driven tractors, also spaced longitudinally therealong, to move generally in a direction normal to the axis of the pipe. Control means automatically adjust the tractor drives to maintain the pipe straight as well as generally normal to, and in proper lateral spaced relation with, a guidance dolly (or sensor) which is made to follow a reference line of travel in the shape of a substantially horizontal closed loop. The pipe is supplied with water from a source within the reference loop and uniformly distributes that water on the ground swept over by the pipe as it continuously travels around the outside of said loop. The sprinkler stations are arranged in sets and controlled automatically to determine the flow from each sprinkler station so that the cumulative flow for a given area is substantially proportional to the rate at which the pipe is passing over the ground in that area. Any number of sprinkler pipes can be operated simultaneously on the reference loop.

16 Claims, 23 Drawing Figures

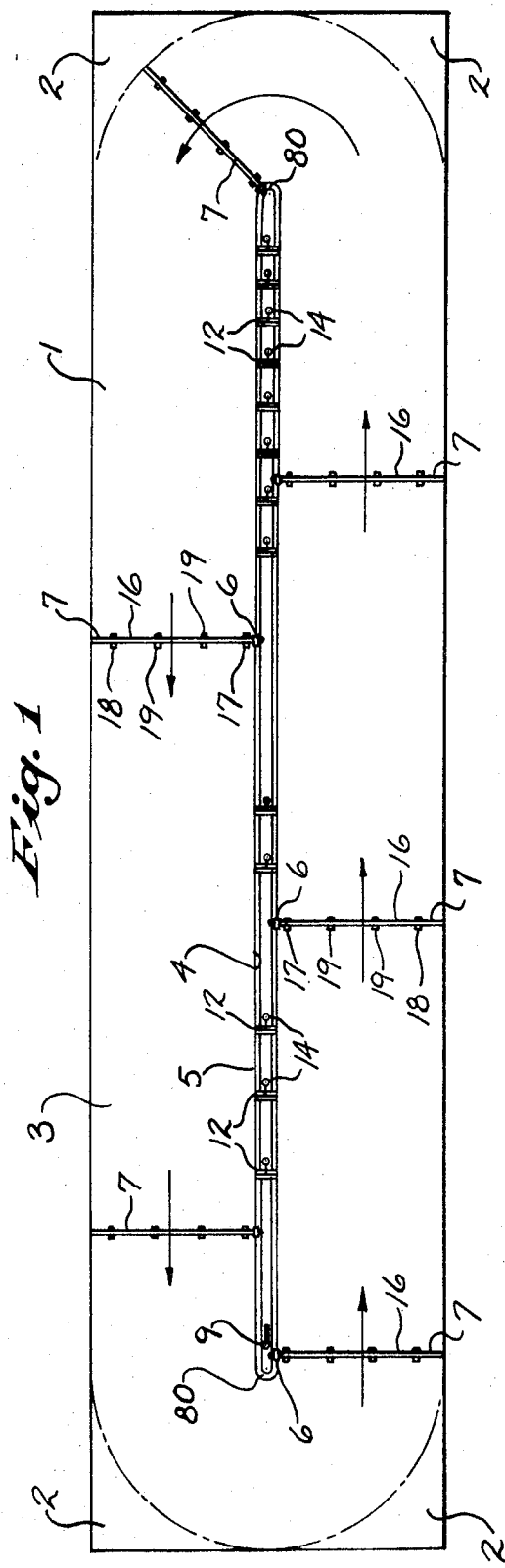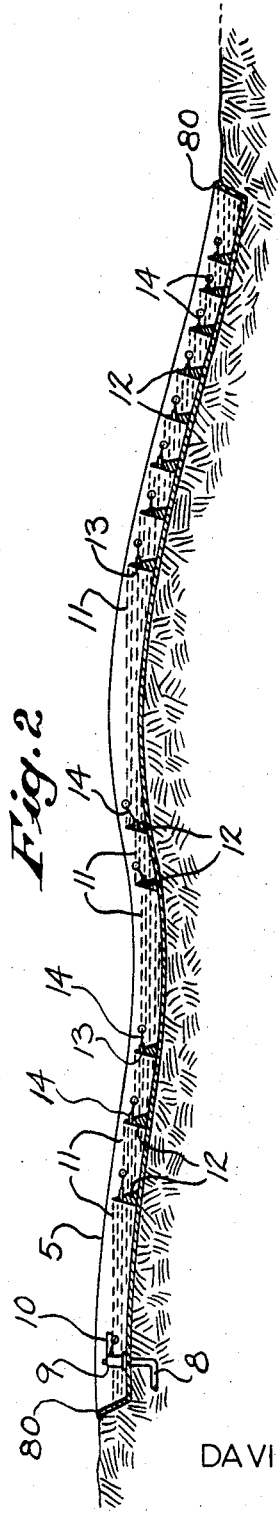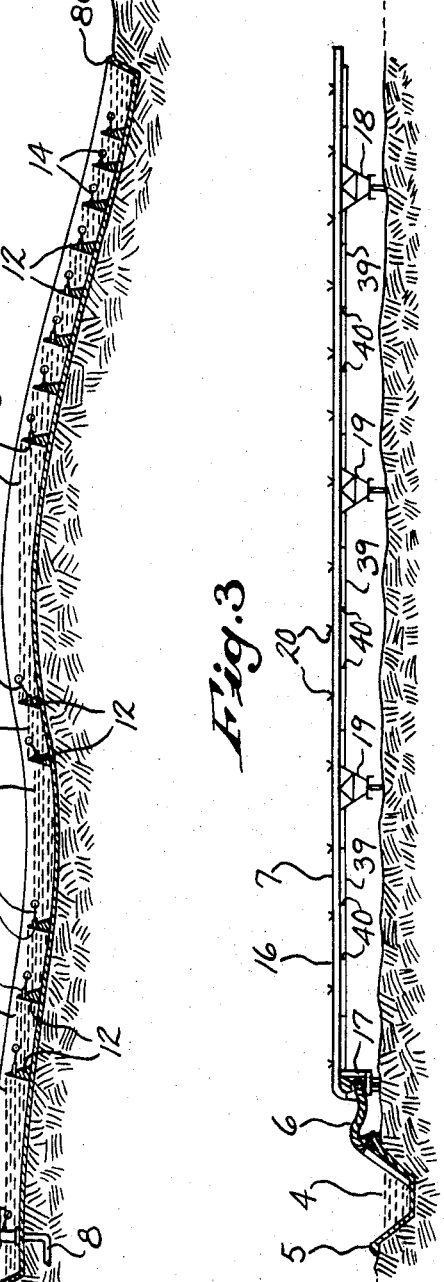
INVENTOR
DAVID C. McMURRAY

INVENTOR
DAVID C. McMURRAY
BY
ATTORNEYS

INVENTOR
DAVID C. McMURRAY
BY
ATTORNEYS

INVENTOR
DAVID C. McMURRAY

BY

ATTORNEYS

INVENTOR
DAVID C. McMURRAY
BY
ATTORNEYS

INVENTOR
DAVID C. McMURRAY

BY
Andrus, Sceales, Starke & Sawall
ATTORNEYS

INVENTOR
DAVID C. McMURRAY

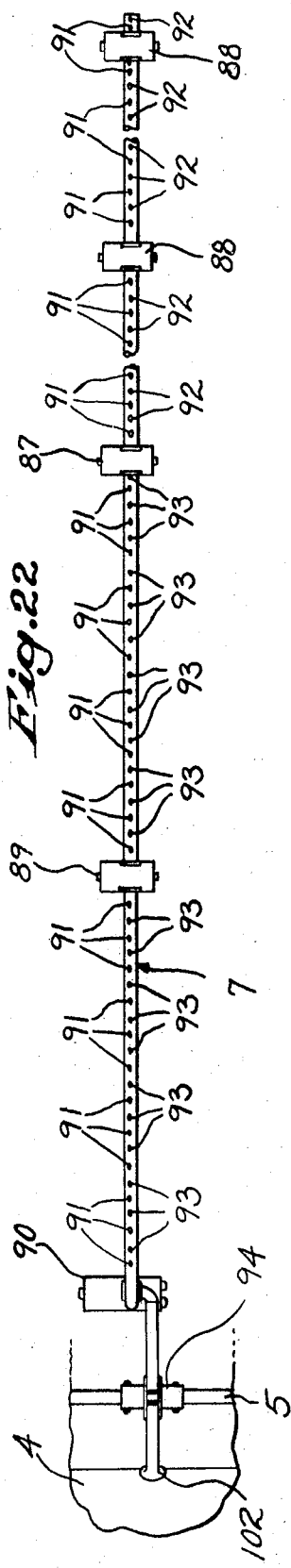
Fig.22
Fig.23
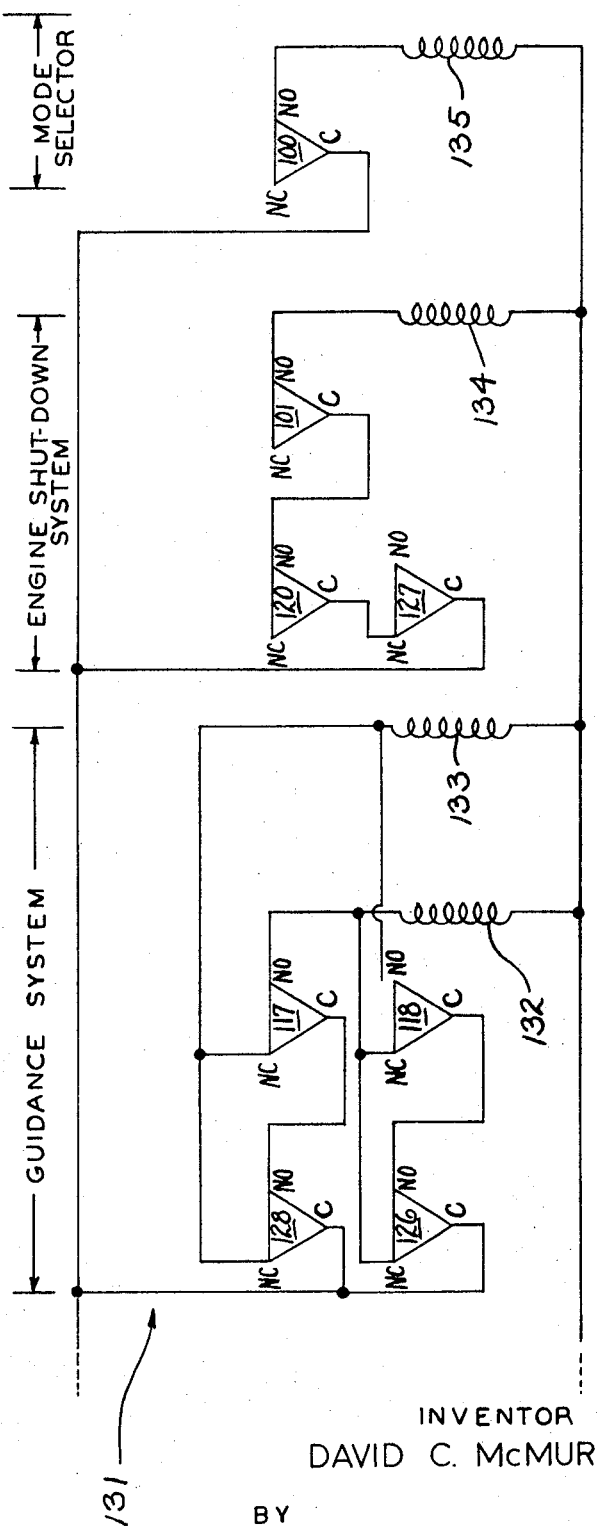
INVENTOR
DAVID C. McMURRAY
BY
ATTORNEYS

MOVING PIVOT SPRINKLER IRRIGATION SYSTEM

BACKGROUND OF THE INVENTION

This invention relates to a moving pivot sprinkler irrigation system wherein a pipe having longitudinally spaced sprinklers thereon is moved over a field in a direction generally normal to the pipe.

Heretofore, sprinkler systems using tractor-mounted sprinkler pipes could be classified as either lateral-move or center-pivot types.

In the lateral-move system, one end of the sprinkler pipe is connected to a water supply in the form of a main or ditch running substantially parallel to the direction of motion of the sprinkler pipe. The sprinkler pipe either reciprocates in its travel over the field along one or both sides of the main, or it travels along one side of the main to the end of the field where it is manually moved endwise to the other side of the main and allowed to return along that side of the field. While both of these methods irrigate rectangular patterns, both require manual labor to complete their cycles and the receiprocating method practices poor irrigation technique since the sprinkler pipe always begins its traverse of the field at the most recently irrigated end of the field.

In the center-pivot system, the sprinkler pipe is caused to pivot about one of its ends which is attached to a stationary water source. These systems irrigate circular patterns and each of the several sprinklers spaced along the pipe is adjusted to distribute water at a rate substantially proportional to the rate at which that sprinkler is travelling across the ground. Thus, those sprinklers disposed farthest from the pivot point deliver water at high rates and those nearest the pivot point deliver water at very low rates. Consequently, that portion of the equipment (sprinkler pipe, tractors, and sprinklers) nearest to the pivot point is used at far less than its capacity. However, the major disadvantage of the center-pivot system is its inability to irrigate the corners of rectangular fields. This is particularly obvious when one or more center-pivot systems is used to sprinkle adjacent circular areas on a long rectangular field.

SUMMARY OF THE INVENTION

According to the present invention the sprinkler pipe is caused to maintain a generally preselected angular and lateral orientation to a guidance dolly or sensor as the latter moves along a reference line which may be either straight, irregular or curved within limits. The sprinkler pipe thus sweeps over an area of ground bound on one side by the reference line and having a width determined by the length of the sprinkler pipe.

A further feature of the invention provides the reference line in the form of a closed path or loop for the travel of the guidance dolly or sensor, whereby the sprinkler pipe will move continuously and automatically around the outside of the closed loop and sweep over an area of ground bearing geometric similarity to the shape of the loop. A source of water is provided along the reference line, preferably inside the closed loop, and the water is picked up therefrom by means traveling with the sprinkler pipe to supply the sprinklers thereon with water.

Long rectangular fields can be effectively irrigated by use of a long narrow reference loop situated lengthwise along the middle of the field. The reference loop should have Substantially parallel sides connected by semi-circular ends which are situated at a distance approximately equal to the length of one sprinkler pipe from the short sides of the rectangle. The reference loop thus takes on the appearance of an elongated race-track and consequently, the pattern swept over by the sprinkler pipe also has that general shape.

The source of water may be an open water ditch extending along the center line of the field or area being sprinkled from which water is pumped to the inner end of the pipe through a water intake traveling along the ditch with the sprinkler pipe.

In one embodiment two sets of sprinklers are provided on the pipe, one in which the sprinklers are all equally adjusted to a maximum desired sprinkling volume for use during translation of the pipe along either side of the field, and the other in which the sprinklers are adjusted to different volumes as related to their individual distances from the pivot to provide a uniform sprinkling of the end areas of the field as the pipe pivots from one side to the other.

In another embodiment where the speed of one of the intermediate tractors remains constant throughout the traverse of the loop, three sets of sprinklers are provided on the pipe, one set operating constantly at a fixed setting with the sprinklers disposed outwardly from the constant speed tractor having an equal maximum flow rate corresponding to that desired for straight ahead pipe movement along the sides of the field and with the sprinklers disposed inwardly from the constant speed tractor having a setting providing a progressively reduced flow rate for each increment of area covered from the constant speed tractor to the innermost tractor at the inner end of the pipe to compensate for the reduced speed of movement of this portion of the pipe at the end curves of the loop, a second set operating to supplement said last reduced flow rate sprinklers during the straight ahead movement of the pipe to provide a cumulative sprinkler flow rate for this inner portion of the pipe corresponding to the maximum flow rate for the constant flow sprinklers in the region outwardly of the constant speed tractor and a third set operating to supplement said equal maximum flow rate sprinklers during turning movement of the pipe around the ends of the loop to provide a cumulative sprinkler flow rate for this outer portion of the pipe corresponding generally to the relative speeds of movement of portions of the pipe over the ground.

The opposite sides of the ditch constitute the reference line for controlling the translation of the sprinkler pipe along opposite respective sides of the ditch, and the reference lines thus provided are preferably joined at the ends in a semi-circle which controls movement of the sprinkler pipe around the ends of the closed loop.

The sprinkler pipe is guided along the reference line by monitoring controls which serve: (1) to retain the pipe straight at all times; (2) to retain the pipe substantially normal to the reference line; and (3) to maintain the inner end of the pipe in a given distance relation to the reference line at all times.

Where the terrain is not level the water ditch is provided with dams to establish different levels of water and by employing two intakes for the pump and spacing the same for successive manipulation over the dams a continuous supply of water is provided to the sprinkler pipe.

The invention enables the employment of several separate sprinkler pipes suitably spaced from each other and all moving continuously around the loop thus provided, with fully automatic control means for each.

Control means may additionally be provided to stop everything in the event one of the sprinkler pipes becomes hopelessly displaced or to temporarily stop one sprinkler pipe in the event it advances too close to the one ahead.

BRIEF DESCRIPTION OF THE DRAWINGS

The drawings furnished herewith illustrate the best mode presently contemplated for carrying out the invention.

In the drawings:

FIG. 1 is a schematic plan view of a rectangular field with the sprinkler system of the present invention applied thereto;

FIG. 2 is a longitudinal section of the water ditch for non-level terrain, showing the employment of dams with water level controls as in FIG. 1;

FIG. 3 is a front elevation of a sprinkler pipe showing the end tractors and two intermediate tractors carrying the same;

FIG. 19 is a detail somewhat schematic section taken on line 19—19 of FIG. 16 and showing the cam control for maintaining the pipe oriented substantially at right angles to the reference line;

FIG. 20 is a detail somewhat schematic section taken on line 20—20 of FIG. 16 and showing the cam control for maintaining the pipe at a given lateral distAnce from the reference line;

FIG. 21 is a detail somewhat schematic section taken on line 21—21 of FIG. 16 and showing the cam control for emergency stopping everything in the event of an extreme undue lateral movement of arm 7 relative to the reference line;

FIG. 22 is a diagram showing the embodiment of three sets of sprinkler heads to obtain more uniform application of water to the field; and FIG. 23 is the wiring diagram for the controls for the embodiment of FIGS. 13–22.

DESCRIPTION OF THE PREFERRED EMBODIMENTS

Figure 4:
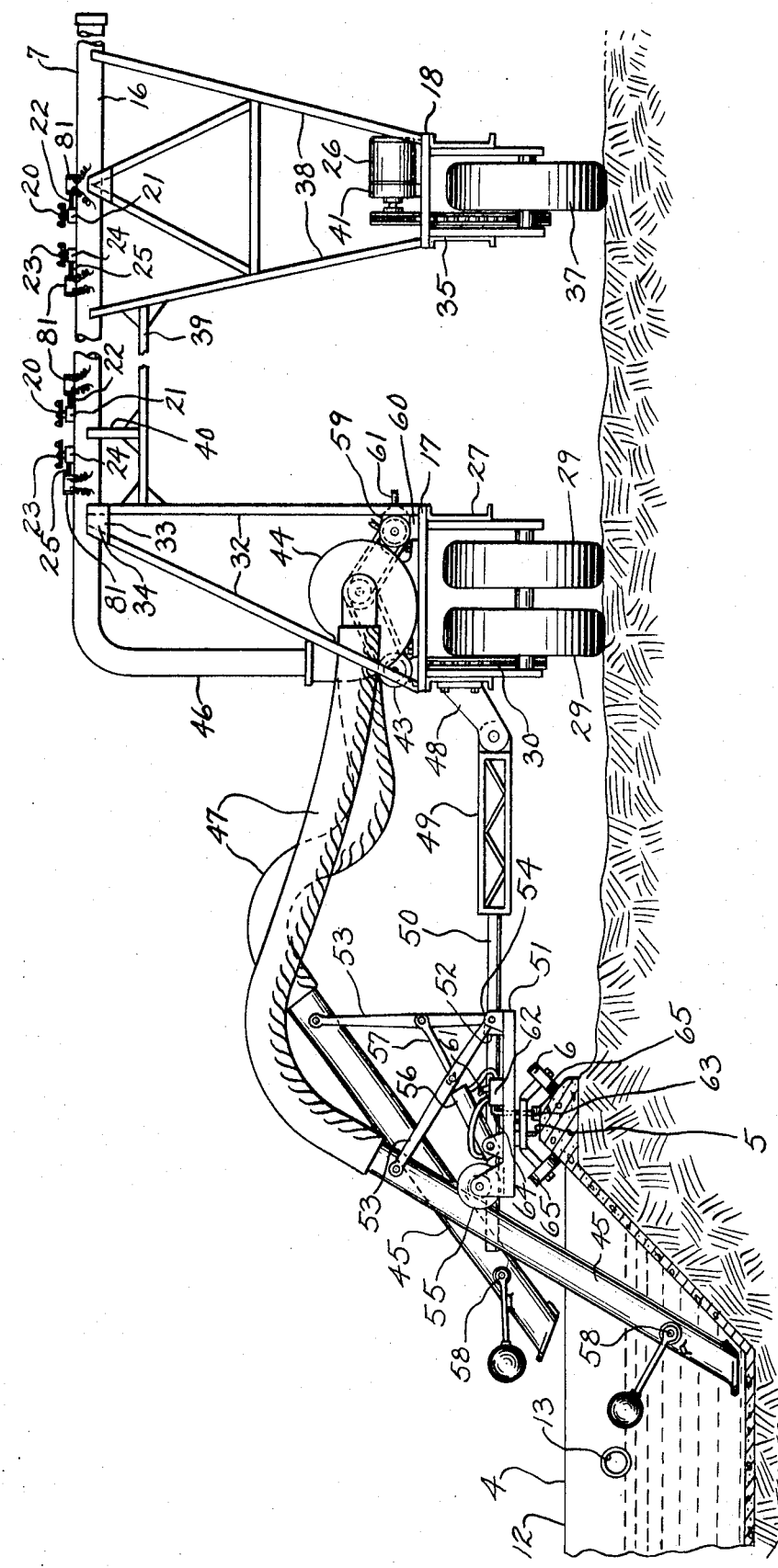
FIG. 4 is an enlarged rear elevational view of the inner and outer end tractors adapted for use on non-level terrain with a partial transverse section of the water ditch showing the water pick-up system and the reference line control.
Figure 5:
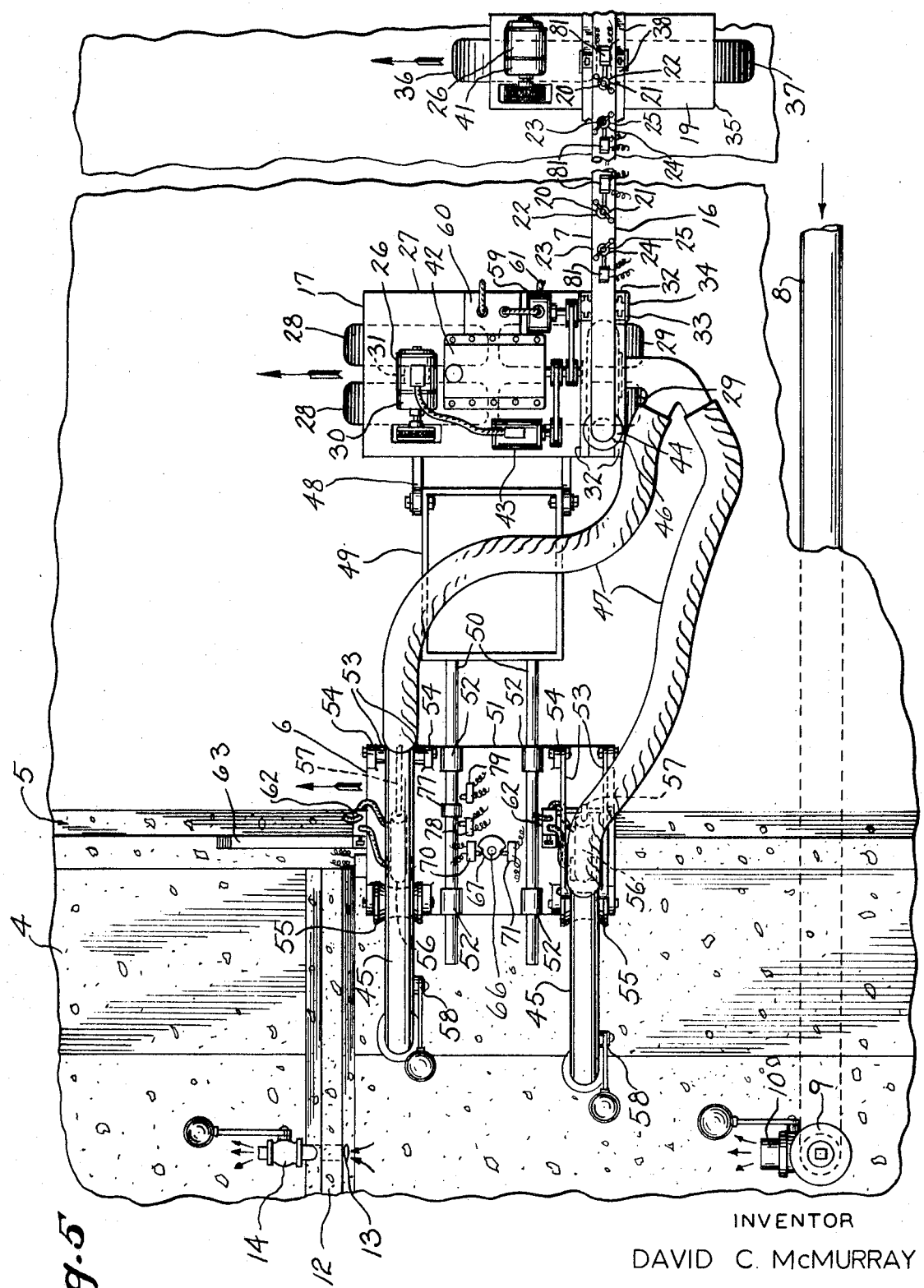
FIG. 5 is a top plan view of the construction of FIG. 4.
Figure 6:
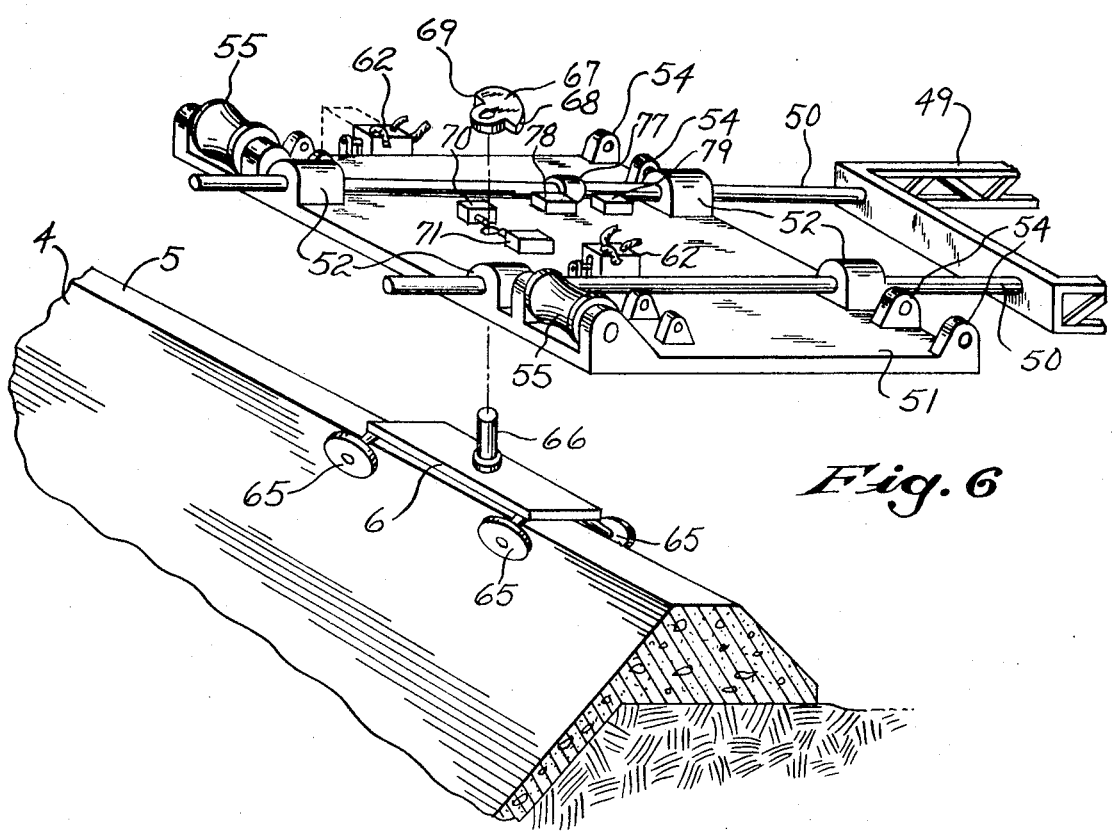
FIG. 6 is an enlarged detail schematic exploded showing of the dolly with the control mechanism thereof and the reference line.

FIG. 1 of the drawings illustrates a rectangular field 1 which may be approximately one-half mile wide and several miles long, and which is to be irrigated as uniformly as possible without producing areas of excessive irrigation or of deficient irrigation. There wIll be four corner areas 2 which must be reached by some additional form of irrigation not here considered.

The system here proposed will provide substantially eQual irrigation throughout the area 3 of field 1, and which generally accounts for over 95 percent of the field.

SUPPLY MAIN

An open water ditch 4 extends centrally, longitudinally of field 1 and to within approximately one quarter mile of each end of the field (a distance equal to one-half the width oF the field).

The ditch 4 comprises a continuous slip-formed concrete lined channel with the walls slanted angularly to either side and providing a ridge or reference line 5 upon which a dolly 6 rides for guidance of a sprinkler arm 7.

Water is supplied to ditch 4 by an underground pipe line 8 terminating with the upright hydrant 9 centrally of the ditch and having a suitable float controlled discharge valve 10 which maintains a given level of water in the ditch.

Assuming that the field is level, the ditch 4 will be substantially horizontal from end to end and substantially the same level of water will be maintained throughout the length of the ditch subject to the flow rate required for a given size ditch to maintain the desired minimum depth of at least two feet of water at the far ends of the ditch. If the length and size of the ditch results in too great a drop in water level during irrigation, additional water supply lines may be provided with discharge valves spaced conveniently along the ditch.

Where the field 1 is not level the water supply should be provided at the highest point of the ditch and the latter should comprise a suitable number of successive level sections 11 as illustrated in FIG. 2 wherein dams 12 separate each section from the adjacent sections.

Each dam 12 has an opening 13 therethrough which is controlled by a float actuated valve 14 to allow water to flow from the higher level section through the dam to a next lower level section 11 and maintain the given water level in the lower section.

If the topography of the field requires that the ditch have more than one high point, a separate water supply will be provided for each high level section.

THE EMBODIMENT OF FIGS. 4 TO 12

The embodiments of FIGS. 4 to 12 is adapted for irrigation of non-level terrain as for instance, the terrain illustrated in FIGS. 1 and 2 wherein dams 12 are employed in the water supply ditch 4.

SPRINKLER ARMS

Irrigation of field 1 is carried out by one or more sprinkler arms 7 extending generally normal to ditch 4 and moving along the same in spaced relation to each other.

Each sprinkler arm 7 extends from the ditch to the outer edge of area 3 to be irrigated, which is a distance of approximately one-quarter of a mile for the field described.

The sprinkler arms 7 are constructed to move along one side of ditch 4 to the end thereof, then to travel around the end in a semi-circle, then move along the other side of the ditch to the opposite end thereof, then to travel around the end of the ditch, and thereafter to move as first stated. In this moveMent each sprinkler arm 7 will cover substantially the entire area 3 of field 1 each time around. In order to supply the desired daily quantity of irrigation for the area 3 and to avoid run off of water, the speed of travel of a sprinkler arm has to be related to its spray volume and with large fields it will be desirable to employ several sprinkler arms suitably spaced from each other, all operating automatically for a given time.

Each arm 7 comprises a water sprinkler pipe 16 of substantial capacity closed at its outer end and supported at its inner end by a tractor 17, at Its outer end by a tractor 18 and at suitably spaced intervals therebetween by intermediate tractors 19.

A plurality of sprinkler heads 20 are spaced along the pipe 16 to receive water therefrom through individual connections 21 with an on and off valve 22 for each sprinkler head.

A second set of sprinkler heads 23 are provided for each sprinkler arm 7 with the heads spaced therealong similar to heads 20 and receiving water from pipe 16 through individual connections 24, each having an on and off valve 25 therefor.

The first set of sprinkler heads 20 are employed when the sprinkler arm moves along ditch 4 from one end of the ditch to the other, during which time each sprinkler head 20 will be adjusted to provide the same volume and area of spray. In general, it is desirable to provide some overlap between the spray areas of adjacent sprinkler heads 20 to insure a continuity of total spray area and uniformity of spray from the ditch 4 to the outer margin of the area 3 for each sprinkler arm.

The second set of sprinkler heads 23 are employed alternate to the first set and only at the ends of the field during the pivotal movement of the sprinkler arm 7 from one side of ditch 4 to the other. The sprinkler heads 23 will be adjusted to provide a uniform spraying of the end portions of area 3.

For this purpose the innermost sprinkler head 23 will have the least ground speed and should be set to provide a low volume of spray while the outermost sprinkler head 23 will have the greatest ground speed and should be set to provide a high volume of spray. Intermediate sprinkler heads 23 should be set individually according to the ground speed therefor so that the water delivery to different areas of the ground at different distances from ditch 4 will be as nearly the same as possible, and substantially the same as the water delivery to corresponding areas of the field subjected to spray from sprinkler heads 20.

TRACTORS

The inner tractor 17, outer tractor 18 and intermediate tractors 19 are all self-propelled and driven preferably by individual motors such as electric motors 26.

The inner tractor 17 comprises a frame 27 supported upon a front pair of laterally spaced wheels 28 and a rear pair of laterally spaced wheels 29 with their axes parallel to the sprinkler arm 7 and generally normal to the reference line 5 of ditch 4.

The motor 26 for tractor 17 is mounted upon frame 27 and is connected through suitable speed reduction mechanism 30 to the shaft 31 for the front wheels 28 to drive the same.

The frame 27 for tractor 17 has side arms 32 extending upwardly to a cross channel 33 which is parallel to pipe 16 and secured rigidly thereto by suitable clamps 34.

The outer tractor 18 comprises a frame 35 supported upon a forward wheel 36 and a rear wheel 37 with their axes parallel to the sprinkler arm 7 and generally parallel to the axes for wheels 28 and 29 of tractor 17.

The frame 35 has upwardly extending side arms 38 which support a cross channel 39 parallel to pipe 16 and secured rigidly thereto by suitable clamps 40.

The motor 26 for tractor 18 is mounted upon frame 35 and is connected through suitable speed reduction mechanism 41 to drive front wheel 36.

The intermediate tractors 19 are constructed similar to tractor 18 and numerals 35 to 41 are applied thereto for the correspondIng elements.

The number of intermediate tractors 19 needed will depend upon the length of sprinkler arm 7 and the maximum spacing of the tractors to provide for a desired rigidity of support for pipe 16. If adjacent tractors are spaced too far apart the pipe 16 may droop excessively therebetWeen the thereby make control of the system difficult and possibly undesirably modify the spray area for given sprinkler heads.

POWER SYSTEM AND WATER PICK-UP

Each sprinkler arm 7 is preferably powered individually by an internal combustion engine 42 on frame 27 of inner tractor 17 and which drives a generator 43 supplying electricity to motor 26.

In addition to providing the electrical power as above described, each engine 42 drives a pump 44 which draws water from ditch 4 through the submerged intake snouts 45 and delivers the water through conduit 46 to pipe 16 under a desired pressure for spraying.

The intake snouts 45 are carried by dolly 6 and are connected to the inlet of pump 44 by the flexible conduits 47.

The dolly 6 is linked to inner tractor 17 by a bracket 48 on the side of frame 27 carrying a pivotal arm 49 having a pair of rods 50 disposed generally parallel to sprinkler arm 7 and spaced in a generally horizontal plane above the platform 51 of dolly 6.

The platform 51 has thereon a pair of blocks 52 on each side thereof through which the rods 50 slide. This construction effects travel of dolly 6 with tractor 17 along ditch 4 and at the same time provides for minor changes in distance between dolly 6 and tractor 17.

Figure 10:
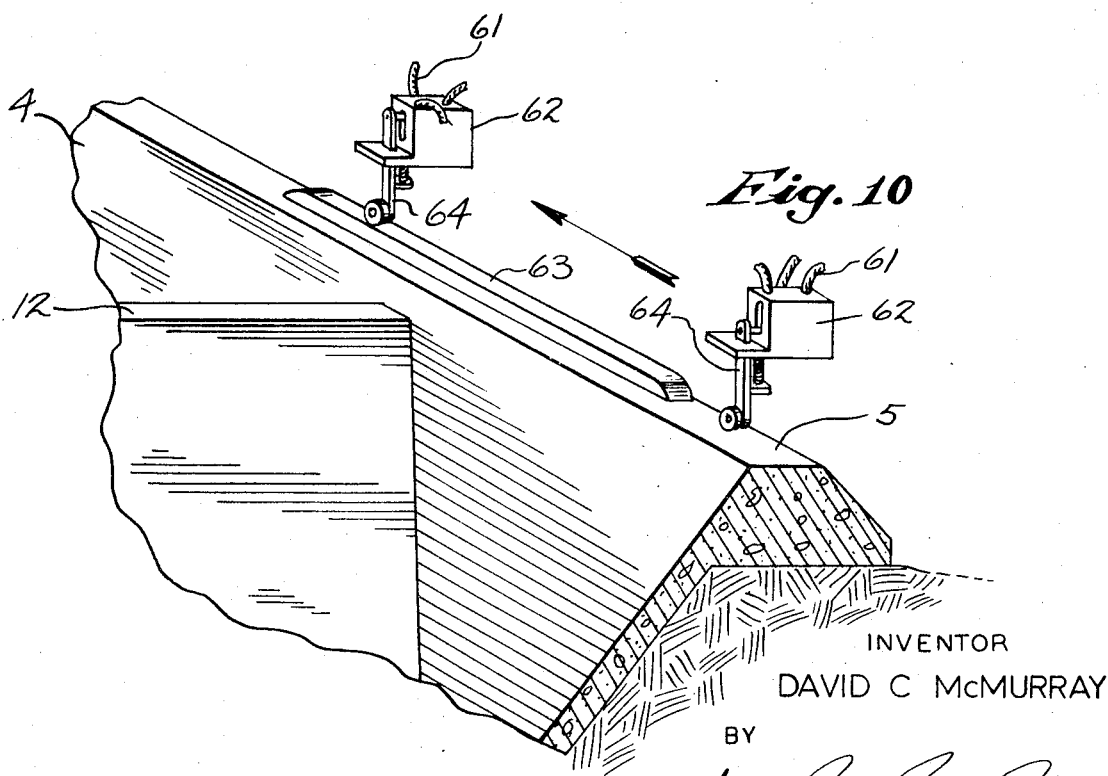
FIG. 10 is an enlarged detail schematic exploded view showing the construction for controlling the intake of water from the ditch as the unit passes a dam.
Figure 7:
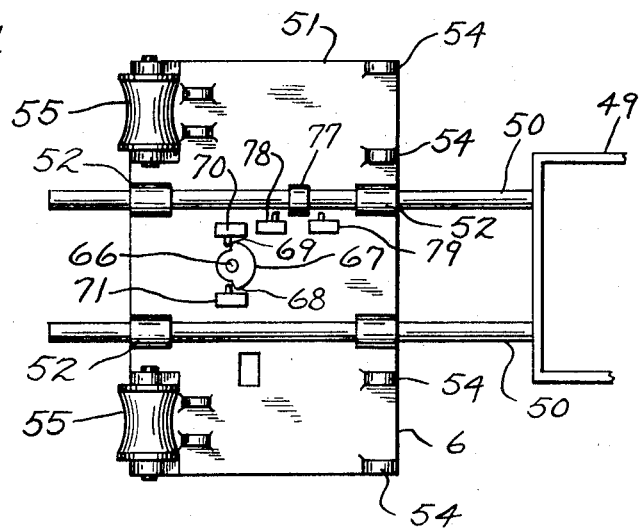
FIG. 7 is a top plan view of the dolly control of FIG. 6.
Figure 8:
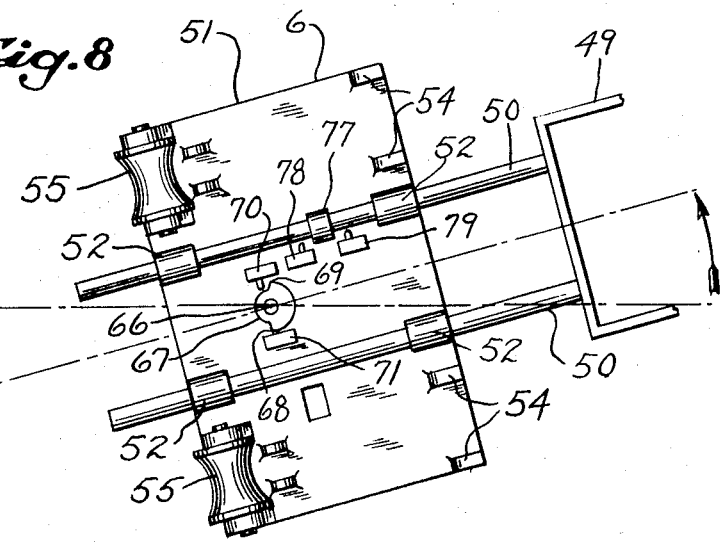
FIG. 8 Is a view similar to FIG. 7 showing the controls activated by an angular orientation of the pipe.

The snout 45 should be submerged at all times, preferably at least two feet, in the water in ditch 4.

Where dams 12 are employed in ditch 4 as illustrated in FIGS. 1, 2 and 10 it is necessary to lift the snout 45 over the dam from one section 11 to another as the tractor 17 and dolly 6 move along the ditch.

In this event it is preferable to employ two separate snouts 45 each pivotally carried by a link 53 on brackets 54 on the outer side of dolly platform 51 and by a roller 55 on the inner side of platform 51.

A power cylinder 56 pivotally supported on platform 51 has its piston rod 57 pivoted to the link 53 whereby retraction of the piston rod locates snout 45 in operative submerged position in ditch 4 and extension of rod 57 lifts the snout out of the ditch sufficient to clear a dam 12.

In operation, the two snouts 45 are spaced sufficiently along the ditch so that the advancing snout may be lifted over a dam 12 and returned to operative position before the trailing snout is lifted over the dam. In this way there will always be at least one snout in the water at all times for supplying water to the intake of pump 44.

Each intake snout 45 has a float controlled shut-off valve 58 therein to close the same as the snout is lifted from the water and thereby maintain sufficient pump suction to effect lifting of water through the other snout 45.

Actuation of cylinders 56 is effected from a hydraulic power source shown as a power pump 59 driven by engine 42 on frame 27 and having a suitable sump 60 and flexible tubular connections 61 to each cylinder whereby the piston therein may be moved in either direction as required.

A control valve 62 in the connections 61 determines the flow of actuating fluid to and from the cylinder 56, and in turn is actuated by a riser 63 on ridge 5 located in the region of a dam adapted to engage a pin 64 actuating the valve to determine lifting of the correspondence snout 45 over the dam as dolly 6 rides along the ridge.

The dolly 6 is supported on ridge 5 by angularly opposed wheels 65 bearing against the oppositely slanting sides of the ridge.

CONTROLS FOR SPRINKLER ARM DRIVES

The controls for each sprinkler arm 7 are designed to orient the arm relative to the reference line 5 and ditch 4, to maintain the arm straight and to location of the arm laterally of the reference line at all times.

For this purpose the platform 51 is pivotally mounted on dolly 6 by a vertical pin 66 generally centrally of the dolly and journalled in the platform. A cam 67 is secured to the upper end of pin 66 and has side lobes 68 and 69 adapted to trip the corresponding limit switches 70 and 71 on platform 51 in the event the platform turns relative to dolly 6 as when the sprinkler arm 7 deviates angularly from the desired position normal to reference line 5.

When the sprinkler arm 7 angles forwardly from the desired normal relation to reference line 5, the lobe 68 engages and trips limit switch 71 which thereupon reduces the speed of motor 26 on outer tractor 18 until the arm returns to the desired position of orientation.

When the sprinkler arm 7 angles rearwardly and begins to trail the desired normal relation to reference line 5, the lobe 69 engages and trips limit switch 70 to reduce the speed of motor 26 on inner tractor 17 until the arm returns to the desired position of orientation.

Figure 12:
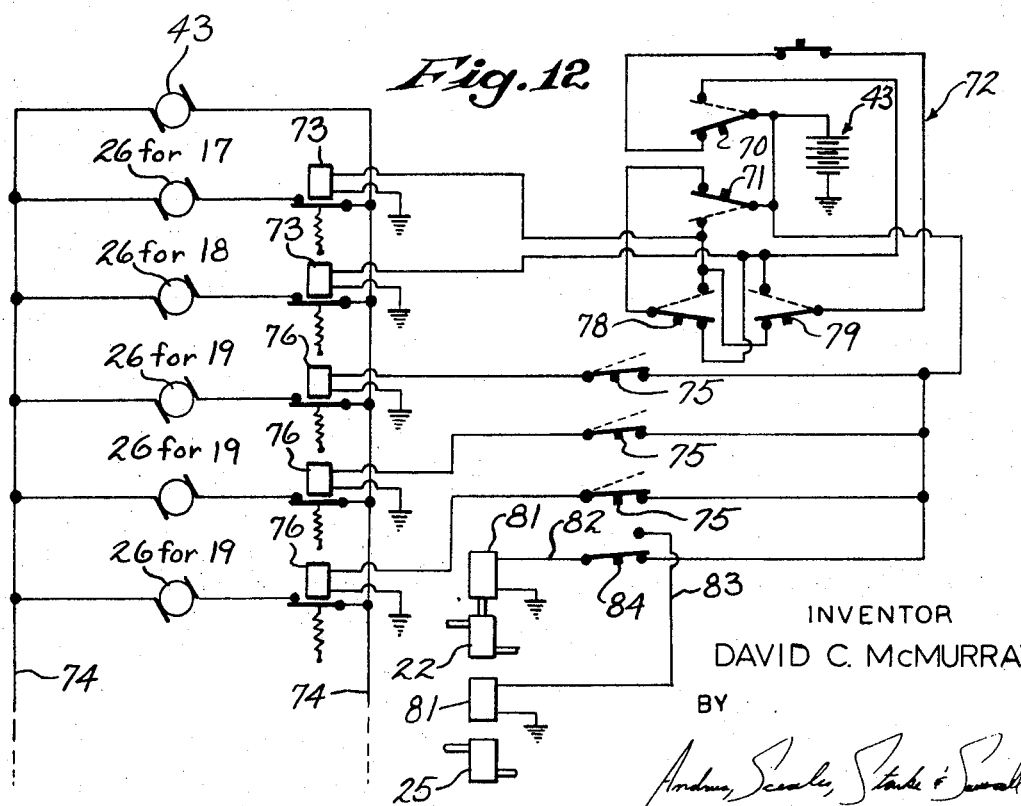
FIG. 12 is a schematic wiring diagram for the controls for the embodiment of FIGS. 4 to 11.
Figure 13:
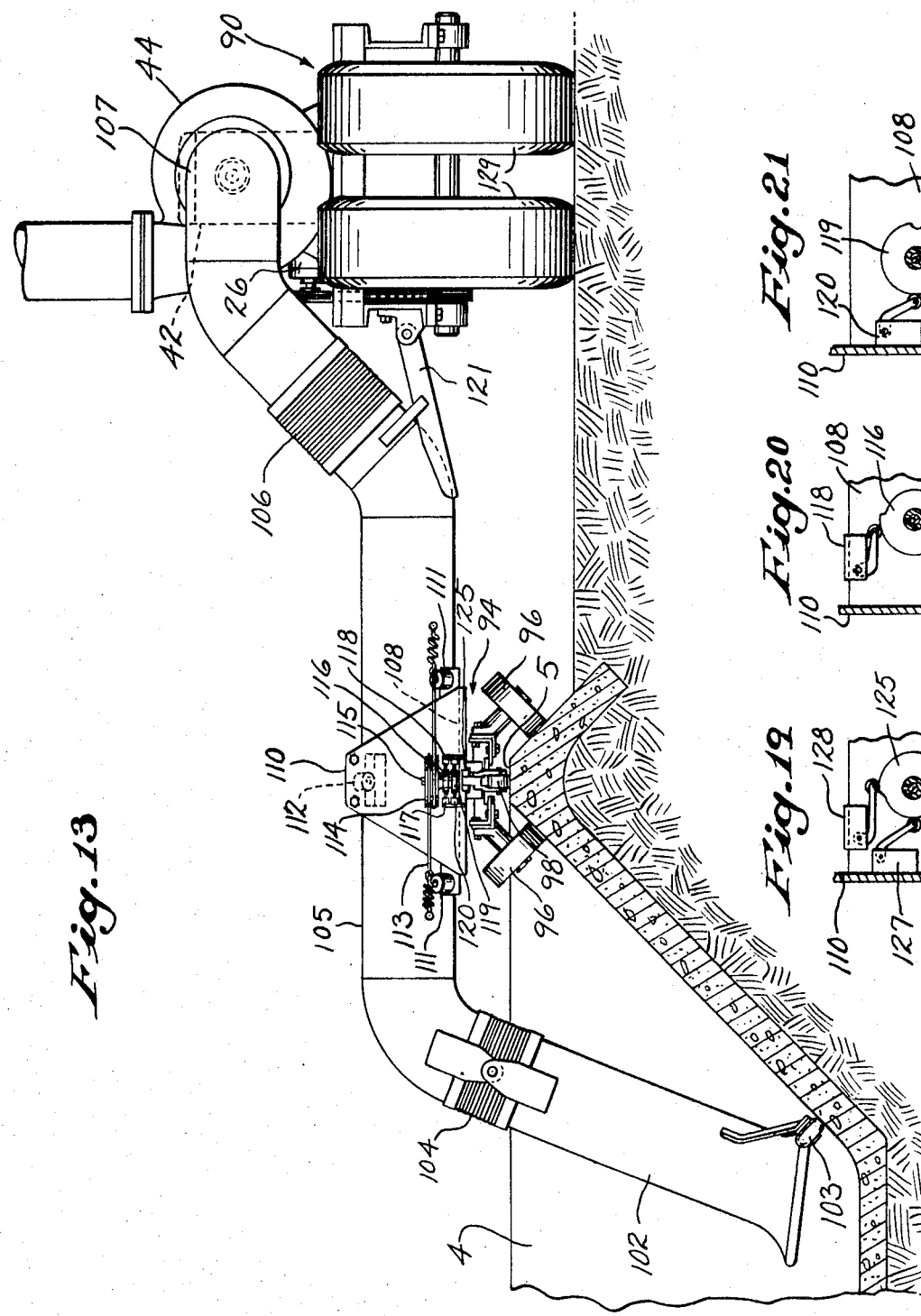
FIG. 13 is an enlarged rear elevational view of the inner end tractor adapted for use on level terrain, with a partial transverse section of the water ditch, and showing the water pick-up system and a second embodiment for the reference line control.
Figure 14:
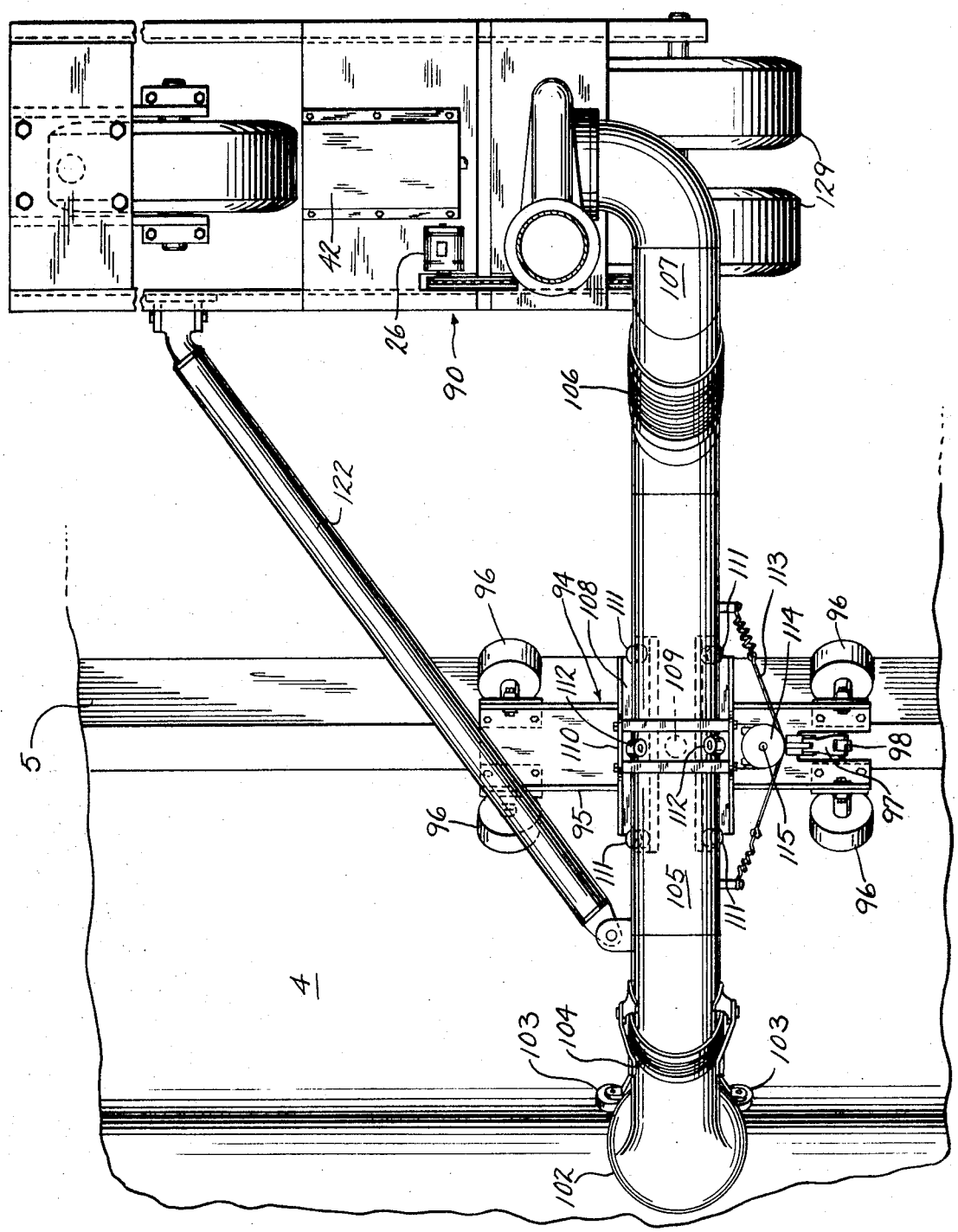
FIG. 14 is a top plan view of the construction of FIG. 13.
Figure 15:
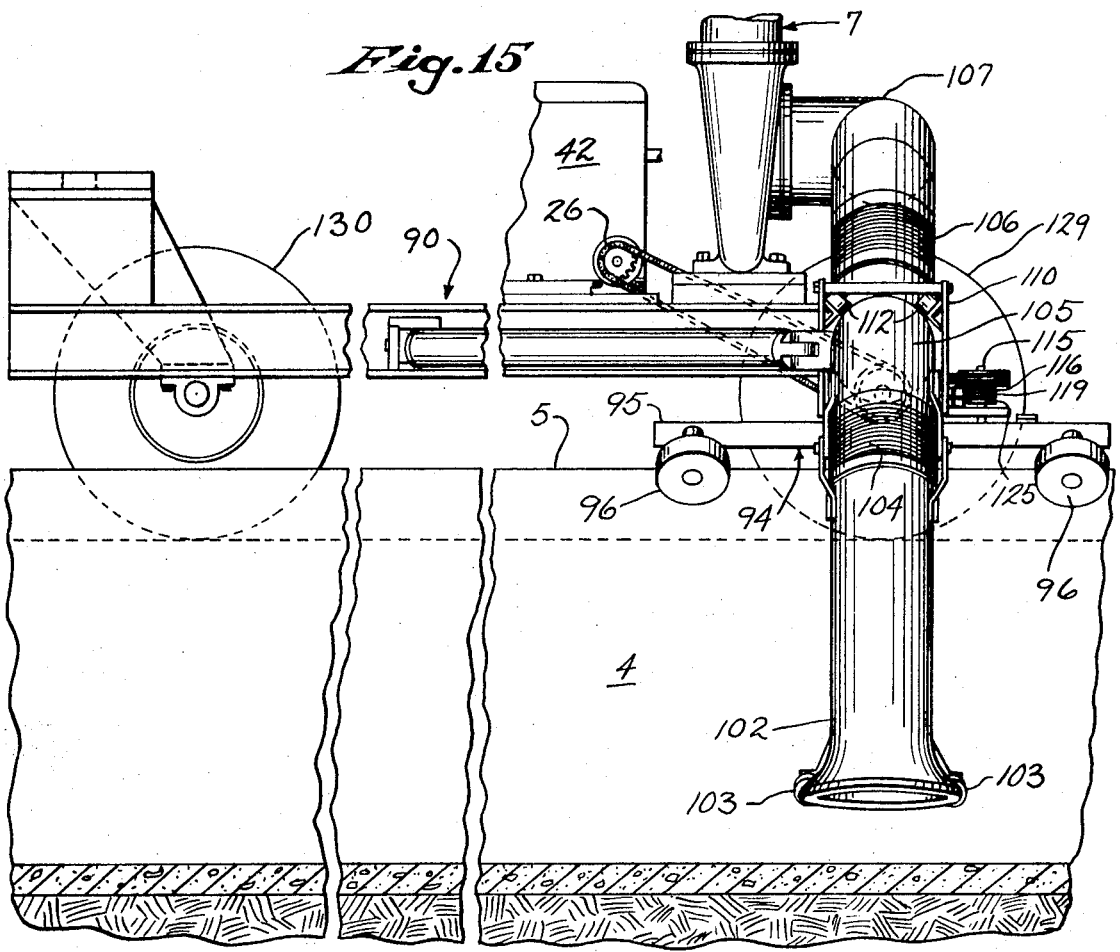
FIG. 15 is a side elevation of the tractor of FIG. 13 looking from the ditch toward the water pick-up side.
Figure 18:
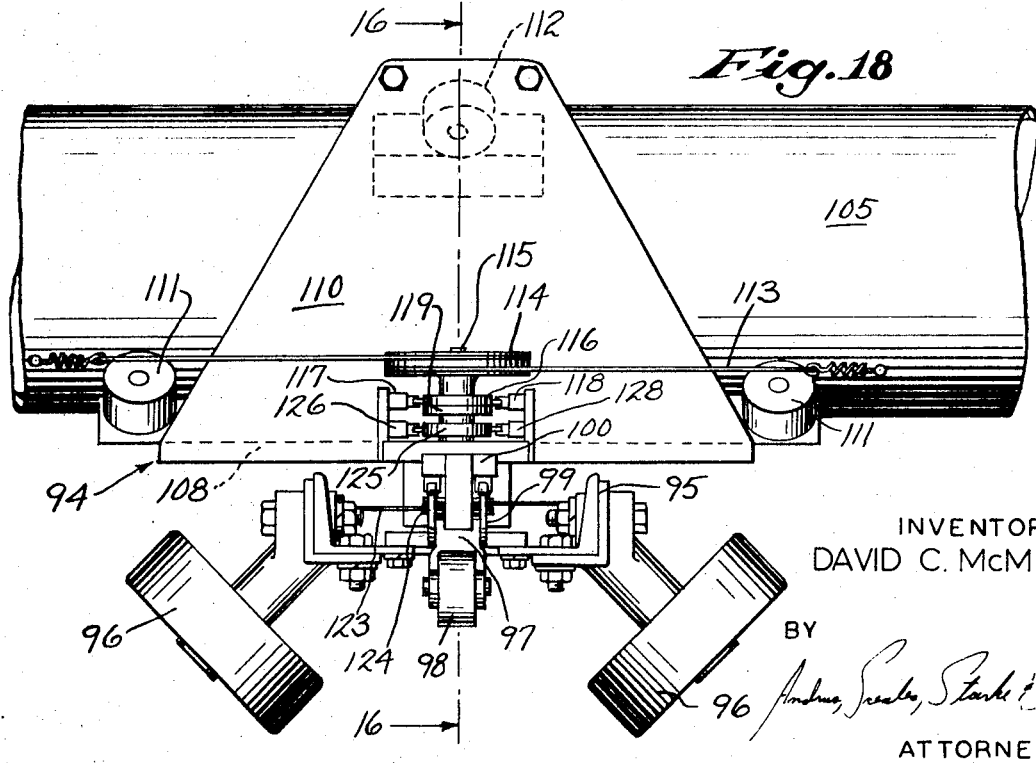
FIG. 18 is a rear elevation of the dolly construction of FIG. 16.
Figures 16, 17:
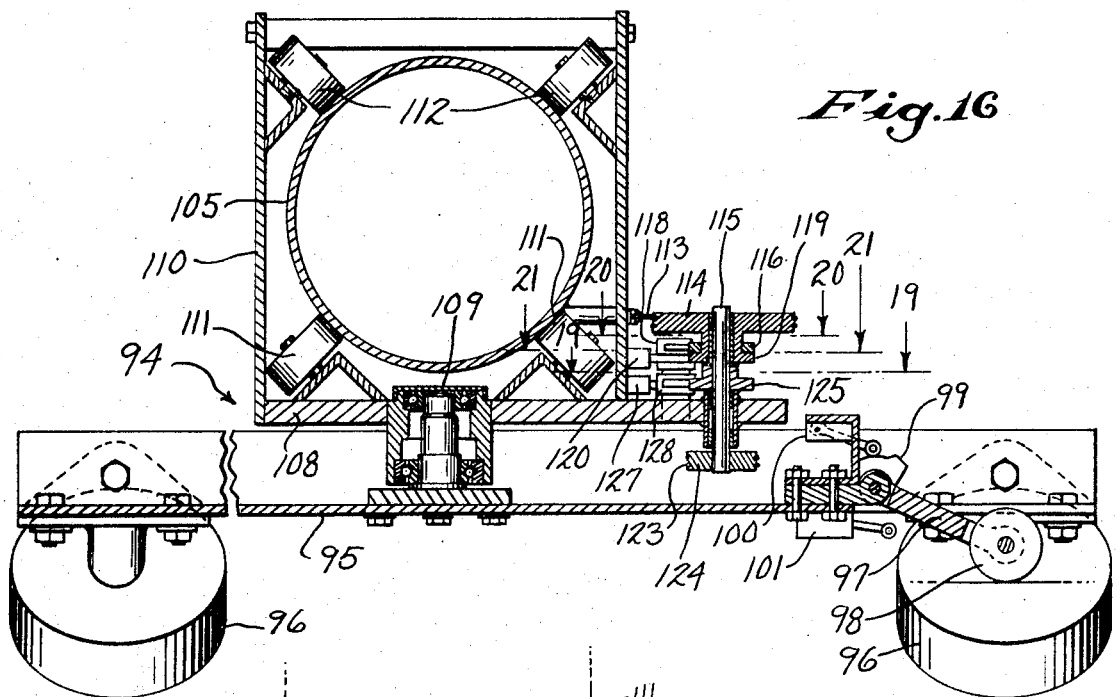
FIG. 16 is an enlarged detail longitudinal central vertical section of the dolly of FIGS. 13–15.
FIG. 17 is a top plan view of the detail dolly construction of FIG. 16 with parts broken away and sectioned.

The limit switches 70 and 71 are disposed in a control line 72 actuating either a rheostat or relay 73 in the power line 74 to the respective motor 26 as shown in FIG. 12.

When one or more tractors 19 advances beyond or trails a straight line between tractors 17 and 18, controls are provided on the given tractor 19 which either slows the drive motor 26 therefor or speeds it up. Such controls may be of the construction set forth in U. S. Pat. No. 3,394,729, granted July 30, 1968.

In essence the control for this purpose comprises a suitable means 75 sensing and actuated by an angular deviation in pipe 6 at a given tractor 19, to operate either a rheostat or relay 76 or other means for slowing down, stopping or speeding up the motor 26 as may be needed.

When a sprinkler arm 7 gradually moves inwardly toward reference line 5 and ditch 4 the rods 50 slide through their blocks 52 on platform 51, and a linear cam 77 carried by one rod engages a limit switch 78 in the control line 72 for stopping motor 26 of tractor 18, whereby tractor 17 will continue to advance and tend to pivot the arm 7 about the tractor 18, thereby resulting in a slight lateral component of movement of tractor 17 until the cam 77 pulls away from limit switch 78 and re-establishes the power for motor 26 on tractor 18. Thereafter the angular control for the arm will straighten its course at the proper distance from the ditch 4.

Figure 9:
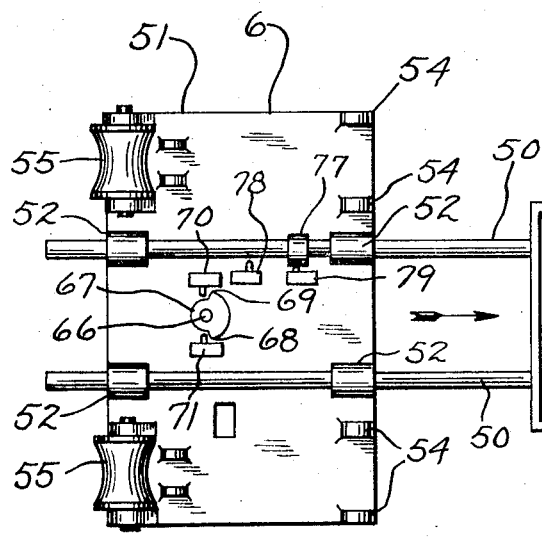
FIG. 9 is a view similar to FIG. 7 showing the controls activated by a movement of the pipe laterally away from the reference line.

When a sprinkler arm 7 gradually moves outwardly away from reference line 5 and ditch 4 as shown in FIG. 9 the cam 77 on rod 50 engages a limit switch 79 on platform 51 and which is in control line 72 for stopping motor 26 of tractor 17, whereby tractor 18 will continue to advance and tend to pivot the arm 7 about the tractor 17, thereby resulting in a slight angular movement directing the arm inwardly toward the reference line 5 until the cam 77 pulls away from limit switch 79 and re-establishes the power for motor 26 of tractor 17. Thereafter the angular control for the arm will straighten its course at the proper distance from the ditch 4.

END PIVOTING OF SPRINKLER ARM

Figure 11:
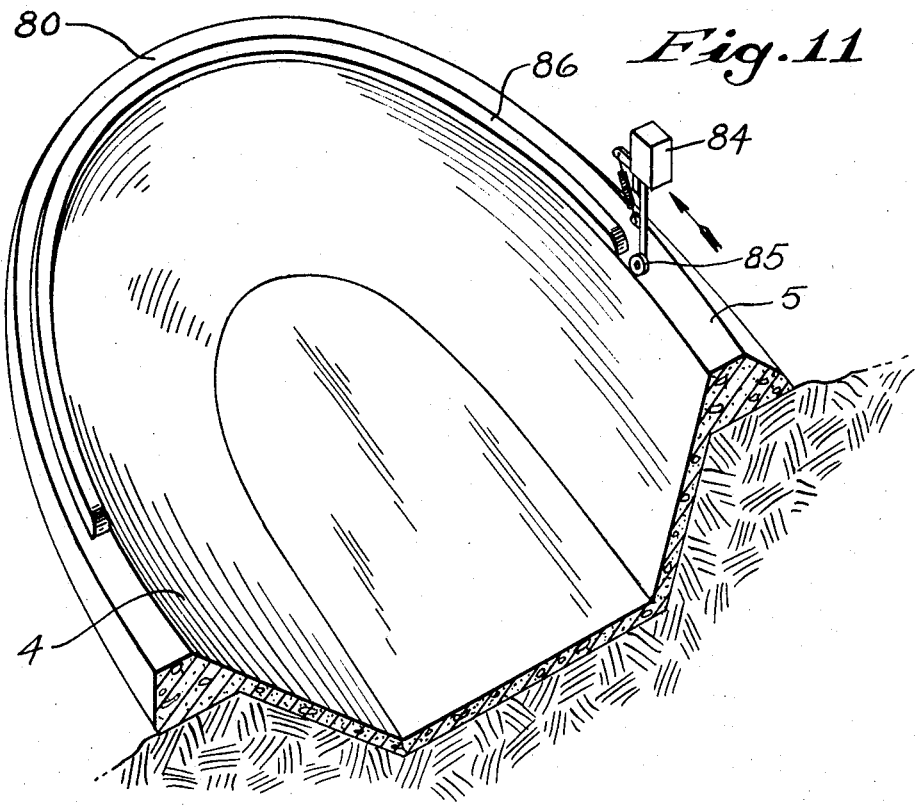
FIG. 11 is an enlarged detail schematic exploded view showing the construction for controlling the pivotal movement of the pipe at the ends of the course, and the selection of alternate sprinkler heads therefor.

At each end of the ditch 4 the ridge or reference line 5 forms a loop 80 in generally semi-circular path between the two longitudinal courses on opposite sides of the ditch as shown in FIG. 11. The several controls previously described may be employed to effect the generally pivotal movement of the sprinkler arm 7 governed by the loop in the reference line 5.

Since during this pivotal movement the inner end of the arm 7 will travel very slowly while the outer end will travel at normal speed, it becomes necessary to change from the first set of sprinkler heads 20 on the arm to employment of the second set of sprinkler heads 23.

For this purpose the valves 22 and 25 are normally closed and are actuated to open position by individual solenoids 81.

The solenoids 81 for actuating the valves 22 of the first set of sprinkler heads 20 are all connected in a control circuit 82 which energizes the same from a suitable source of current, preferably a battery 43 which also supplies control circuit 72.

The solenoids 81 for actuating the valves 25 of the second set of sprinkler heads 23 are all connected in a control circuit 83 which energizes the same from the same source of current as circuit 82.

The circuits 82 and 83 are connected to the source of current alternatively by a double throw switch 84 which in one position closes circuit 82 and opens circuit 83 and in the other position opens circuit 82 and closes circuit 83.

Switch 84 is biased by a suitable spring to the position where circuit 82 is closed and circuit 83 is open.

Switch 84 is carried by platform 51 and is moved to the opposite position in response to a cam follower 85 which engages a cam strip 86 on ridge 5 in the region of loop 80.

Thus during travel of sprinkler arm 7 along either side of ditch 4 the valves 22 will be held open by energization of their solenoids. As the sprinkler arm 7 reaches the end of ditch 4 the cam strip 86 will close switch 84 thus disconnecting solenoids 81 for valves 22 to stop the flow of water to the first set of sprinkler heads 20 and connecting solenoids 81 for valves 25 to supply water to the second set of sprinkler heads 23.

The cam strip 86 extends along loop 80 and terminates at each end thereof so that the second set of sprinkler heads 23 operate throughout the semi-circular movement of sprinkler arm 7 at the ends of the field, and the first set of sprinkler heads 20 operate throughout the linear travel of sprinkler arm 7 on either side of the ditch 4.

The apparatus thus enables the automatic irrigation of a large field with repeated substantially uniform spraying of water over the entire area covered by the sprinkler arm to apply a given amount of water to the field each day. The rate of water application will depend upon the topography, the type of soil, the weather conditions and the speed of arm movement or number of cycles or revolutions in a day. Also, as many sprinkler arms may be employed as economics and requirements indicate to be practical.

THE EMBODIMENT OF FIGS. 13 TO 23

The embodiment of FIGS. 13 to 23 is adapted for irrigation of level terrain where no dams are needed in the water supply ditch 4.

Various parts of this embodiment are the same and are numbered the same herein as corresponding parts for the embodiment of FIGS. 4 to 12. Also various features of this embodiment such as the sprinkler control system and the tractor drive system are interchangeable with corresponding features of the embodiment of FIGS. 4 to 12.

SPRINKLER ARMS

Referring to the embodiment of FIGS. 13 to 23, the speed of travel of each arm 7 over the terrain is generally governed by the central tractor 87 which is intended to have approximately a constant speed throughout the closed path of travel of the arm. Thus, at each end of the loop where the path of the arm is semi-circular, the tractors 88 disposed outwardly from tractor 87 will speed up with the outer end tractor having the highest speed, and the tractors 89 disposed inwardly from tractor 87 will slow down with the innermost tractor 90 having the slowest speed. Along the generally straight sides of the loop all tractors 87, 88, 89 and 90 will have approximately the same speed.

Three sets of sprinkler heads 91, 92 and 93 are employed in order to provide a uniform sprinkling of the terrain throughout the path of movement of the arm.

Referring to FIG. 22, the water distribution for sprinkler heads 91 which are spaced along the full length of sprinkler pipe 16 is adjusted to provide a substantially uniform sprinkling for the heads 91 adjacent to tractor 87 and heads 91 disposed outwardly thereof, and to provide a gradually reduced sprinkling per foot of arm 7 inwardly from tractor 87 toward tractor 90.

The sprinkler heads 91 operate with the described adjustment constantly throughout the travel of arm 7, both during travel along each side of the field and during the generally semi-circular travel at each end of the field.

The reduced sprinkling provided by sprinkler heads 91 inwardly from the constant speed tractor 87 generally compensates for the slower speed of movement of the inner end of pipe 7 at the ends of the loop.

The sprinkler heads 92 are spaced along the portion of sprinkler pipe 16 between tractor 87 and the outer end of the pipe and are adjusted to cumulatively increase the rate of sprinkler flow per foot of sprinkler pipe outwardly from tractor 87 to generally compensate for the increased ground speed of movement of that portion of arm 7 as it travels around the semi-circular ends of its course to thereby provide a substantially uniform application of water to each unit of area of ground traversed thereby generally equal to that for the traversed area units along the side of the field.

For this purpose, sprinkler heads 92 are shut off during the straight course of arm 7 along either side of the field and are actuated only during the curved course of arm 7 at the ends of the field.

The sprinkler heads 93 are spaced along the portion of sprinkler pipe 16 between tractor 87 and the inner end tractor 90 and are adjusted to generally cumulatively compensate for the reduction in flow from the sprinkler heads 91 in that region of the arm 7 during straight ahead traverse of arm 7 along the sides of the field.

Thus, while sprinkler heads 91 are adjusted to provide a decreasing rate of sprinkling per foot of pipe 16 inwardly from tractor 87 to give a substantially uniform application of water to the traversed area of ground on the semincircular end turns, sprinkler heads 93 are adjusted to provide an increasing rate of sprinkling per foot of pipe 16 inwardly from tractor 87 to give a summation of water delivery by the sprinkler heads 91 and 93 in the region that will be uniform when the arm 7 is traveling along the sides of the field in a substantially straight course.

For this purpose, sprinkler heads 93 are shut off during the semi-circular travel of arm 7 at the ends of the field and are actuated only during the straight course of arm 7 along either side of the field.

The result of the employment of the three sets of sprinkler heads 91, 92 and 93 as described is to provide a uniform rate of sprinkling for all areas of ground traversed by each arm 7, the rate being that desired for the area traversed by tractor 87 which moves at a substantially constant speed throughout the path of arm 7.

In summary, this is accomplished by actuating sprinkler heads 91 and 92 during traverse of the semi-circular ends by arm 7, and by actuating sprinkler heads 91 and 93 during traverse of the substantially straight sides of the field by arm 7.

THE CONTROL DOLLY AND WATER PICK-UP

The control dolly 94 for the embodiment of FIGS. 13 to 23 comprises a frame 95 mounted on a pair of angularly disposed wheels 96 at each end of the frame and which straddle the ridge or reference line 5 on the side of ditch 4.

The trailing end of frame 95 carries a longitudinally extending pivotal arm 97 supported at its outer end by the roller 98 which constitutes a cam follower riding upon the top of ridge 5.

The inner pivotal end of arm 97 has a sprinkler selector cam 99 secured thereon and which actuates the necessary control switch for determining the alternate actuation of sprinkler heads 92 and 93.

For this purpose, when roller 98 encounters and rides upon raised cam 86 on the semi-circular end portions of the track or reference line 5, the arm 97 is raised and pivots cam 99 to actuate switch 100 in the control circuit for the sprinkler heads to thereby open sprinkler heads 92 and stop sprinkler heads 93.

When roller 98 rides on the top of ridge or reference line 5 along the straight course on either side of ditch 4, the arm 97 positions cam 99 to release switch 100 and effect stopping of sprinkler heads 92 and actuation of sprinkler heads 93.

In the event the dolly should accidentally leave the ridge or reference line 5, the arm 97 will fall and cam 99 will trip a cut out switch 101 which stops the engine 42 as by disconnecting the ignition therefor.

The water pick-up system comprises a tubular pick-up snout 102 angularly disposed in ditch 4 with its lower end always submerged in the water therein.

The snout 102 is supported on a pair of fore-and-aft rollers 103 which ride on the inclined side of the ditch 4.

The snout 102 is connected by a section of flexible tubing 104 to a horizontal pipe section 105, generally parallel to sprinkler pipe 16 and overlying the dolly 94.

The pipe 105 is in turn connected by a section of flexible tubing 106 to the intake pipe 107 for water pump 44 on tractor 90.

The dolly 94 has a platform 108 pivotally mounted on frame 95 on a vertical central axis 109.

The platform 108 carries a rectangular cage 110 extending transversely thereof and having a pair of diagonal rollers 111 at each end for supporting the horizontal pipe section 105, and a pair of diagonally generally downwardly facing rollers 112 centrally thereof to embrace pipe section 105 and retain the same upon rollers 111.

The pipe section 105 is adapted for limited axial movement through cage 110 as when the sprinkler pipe 16 gradually moves away from or toward the reference line 5.

This lateral or transverse movement of sprinkler pipe 16 is controlled within limits by a cable 113 secured at its opposite ends to one side of pipe section 105 near the opposite ends of the latter.

The central portion of cable 113 is wrapped around a pulley 114 freely rotatable upon the vertical shaft 115 which in turn is carried by platform 108 and spaced rearwardly from axis 109.

The shaft 115 carries a transverse alignment cam 116 which is locked to and rotates with the pulley 114 and actuates switches 117 and 118 which stops either the tractor 87 or the inner end tractor 90, depending upon the need for driving the sprinkler pipe 16 away from or toward the reference line 5.

A second cam 119 is freely rotatable on shaft 115 and locked to pulley 114 for actuating a limit switch 120 to stop engine 42 as by disconnecting the ignition therefor in the event of undue lateral displacement of sprinkler pipe 16 relative to reference line 5.

The pipe section 105 is attached to the inner tractor 90 to turn in a horizontal plane in response to angular displacement of sprinkler pipe 16 in a generally horizontal plane. For this purpose, an arm 121 on the inner end of pipe section 105 is pivotally connected to the frame of tractor 90 on a horizontal hinge axis, so that relative angular displacement between the two pipes in a vertical plane will not be inhibited within limits.

A diagonal strut 122 links the forward end of tractor 90 with the inner end of pipe section 105 and cooperates with link 121 to retain section 105 generally parallel to sprinkler pipe 16 in a horizontal plane.

Thus, in the event tractor 90 and sprinkler pipe 16 become angularly displaced relative to the reference line 5 in a horizontal plane, the same angular displacement will be effected for pipe section 105 and cage 110.

This angular displacement reflects in a corresponding turning of cage 110 and platform 108 relative to frame 95 upon vertical axis 109.

A cable 123 has its opposite ends secured to the corresponding opposite sides of frame 95 and its central portion wrapped around a pulley 124 fixed on shaft 115, whereby the angular displacement of platform 108 turns the shaft 115.

An angular displacement cam 125 is secured on shaft 115 and actuates switches 126, 127 and 128 upon turning of shaft 115 to modify the drive of tractors 87 and 90 depending upon the angular correction needed to maintain sprinkler pipe 16 substantially normal to reference line 5, or to provide an emergency stop.

Tractor 90 is mounted on and driven by a pair of rear wheels 129. The forward end of the tractor is mounted on a caster wheel 130 which is generally free to turn in the direction desired, determined by the desired orientation of sprinkler pipe 16 with its course. Tractors 87, 88 and 89 are mounted on driven wheels like tractors 18 and 19 in FIGS. 4 to 12.

CONTROL CIRCUIT FOR FIGS. 13-22

As shown in FIG. 23, a low voltage control circuit 131 is provided for the several limit switches with four output relays 132, 133, 134 and 135 for controlling the several power circuits.

When circuit 131 is energized relay 133 is normally closed to energize the drive motor 26 for inner tractor 90. Relay 132 is normally closed to energize the drive motor 26 for constant speed tractor 87. Relay 134 is normally closed to energize the ignition system for the engine 42 on tractor 90. Relay 135 is normally de-energized allowing the control circuit to open a valve (not shown) admitting water to sprinkler heads 93 and closing a valve (not shown) thereby cutting off the supply of water to sprinkler heads 92, and when relay 135 is energized the control circuit closes the valve to sprinkler heads 93 and opens the valve to sprinkler heads 92.

Limit switch 100 is a two position on and off switch mounted above cam 99. When cam 99 lifts the actuating arm of switch 100, as when roller 98 rides up on cam ridge 86, switch 100 closes to energize relay 135 and actuate the sprinkler heads 92 and deactivate the sprinkler heads 93 during traverse of the sprinkler pipe 16 in the semi-circular path at the ends of the track or reference line 5.

When cam 99 drops to the intermediate position, as when roller 98 rides off from cam ridge 86 and upon the top of the ridge or reference line 5 along the straight course on either side of ditch 4, switch 100 opens to de-energize relay 135 and deactivate sprinkler heads 92 and activate sprinkler heads 93 during traverse of the sprinkler pipe 16 along either side of the field.

Should an emergency arise wherein roller 98 runs off the top of ridge 5 and drops arm 97 completely, switch 101 will open and de-energize relay 134, thereby opening the engine ignition circuit and stopping engine 42 and all further operation of the device.

Actuation of limit switch 117 by rotating of cam 116 clockwise upon turning of pulley 114 by cable 113 when pipe section 105 moves inwardly toward ditch 4 opens the switch and de-energizes relay 132 and thereby stops the motor driving tractor 87, whereby continued driving of tractor 90 will turn the sprinkler pipe 16 angularly outward and thus gradually move pipe section 105 outwardly until cam 116 returns the switch to closed position and tractor 87 is again driven.

Actuation of limit switch 118 by rotation of cam 116 counterclockwise upon turning of pulley 114 by cable 113 when pipe section 105 moves outwardly away from ditch 4, opens the switch and de-energizes relay 133 and thereby stops the motor driving tractor 90 whereby continued driving of tractor 87 will turn the sprinkler pipe 16 angularly inward and thus gradually move pipe section 105 inwardly until cam 116 returns the switch to closed position and tractor 90 is again driven.

The cam 116 is so constructed that a predetermined range of movement of pipe section 105 is permitted before actuation of either switch 117 or 118, and the correction is effected merely by a slight turning of the arm 7 whereupon normal operation is resumed.

In the event of an emergency arising from a lateral movement of arm 7 toward or away from ditch 4 a distance substantially beyond the range permissible, the cam 119 will open switch 120 which de-energizes relay 134 thereby stopping engine 42.

Actuation of switch 128 by turning of cam 125 clockwise by cable 123, as when the arm 7 becomes angularly displaced forwardly of the desired perpendicular position relative to the reference line 5, opens the switch and thereby de-energizes the relay 132 and stops the tractor 87. Continued driving of tractor 90 restores the arm 7 to its perpendicular position at which time cam 125 again engages switch 128 to close the same and relay 132 is energized to close the drive circuit for tractor 87.

Actuation of switch 126 by turning of cam 125 in a counterclockwise direction by cable 123, as when the arm 7 becomes angularly displaced behind the desired perpendicular position relative to the reference line 5, opens the switch and thereby de-energizes the relay 133 which stops tractor 90 until tractor 87 moves arm 7 into the perpendicular position.

The semi-circular path of the arm 7 at the ends of the course is effected generally by the switch 126 operating as above described.

In the event the arm 7 becomes angularly displaced to such an extent as to cause cam 125 to actuate switch 127 the latter will, in such an emergency, de-energize relay 134 and open the ignition circuit for engine 42, thereby stopping everything.

Both embodiments of the invention provide substantially uniform water application to the area 3 of field 1. The invention enables the employment of several spaced arms moving successively around the field during the desired period of sprinkling each day to deliver the needed quantity of water to the crop and the soil.

Various modes of carrying out the invention are contemplated as being within the scope of the following claims particularly pointing out and distinctly claiming the subject matter with applicant regards as his invention.

I claim:

1. In a moving pivot sprinkler irrigation system, a sprinkler arm comprising a pipe with a plurality of sprinkler heads spaced therealong, individual self-propelled tractor means supporting said sprinkler arm at intervals along its length and adapted to translate the same over a field area to be irrigated, means to supply said pipe with water, a reference line disposed in a closed loop to establish a course of movement for the sprinkler arm, means to guide and maintain said sprinkler arm both angularly and laterally, relative to said reference line, and said last named means including means to actuate said tractor means to correct the orientation of said sprinkler arm relative to said reference line when said arm deviates beyond a predetermined tolerance limit of angular or lateral displacement.

2. The construction of claim 1 in which said last named means includes means to slow the translation of said arm at a selected portion thereof to alter the angular and lateral orientation of the arm relative to said reference line.

3. The construction of claim 1 in which said last named means includes means to stop the translation of a selected portion of said arm to alter the angular orientation of the arm and its overall distance from said reference line.

4. The construction of claim 1 in which said last named means includes means responsive to deviations of said arm from straightness to maintain said arm straight within predetermined tolerance limits, and means responsive to angular and lateral deviations of said arm to control the relative speeds of certain of said tractors to correct the angular and lateral orientation of the arm within predetermined tolerance limits.

5. The construction of claim 1 in which said arm extends outwardly from said reference line and follows the closed loop thereof in translation, said water supply means comprises an open ditch extending longitudinally of a field, a pump disposed to move along with the inner end of said sprinkler arm with water intake means submerged within the water in said ditch to supply water continuously to said pipe from said reservoir, and side walls for said ditch providing a track on each side thereof constituting said reference line, a dolly supporting said water intake means disposed to ride along said track, and said guide means comprises means connecting said sprinkler arm and dolly to monitor relative positions of the same at all times.

6. The construction of claim 5 in which said ditch has sections of different elevations with dams therebetween, and means responsive to movement of said arm along said track in the region of a dam to lift said water intake over each dam as said sprinkler arm passes the same.

7. The construction of claim 6 in which said sprinkler arm is provided with two separate water intakes spaced relative to each other longitudinally of said ditch, and said lift means comprises means to successively lift and resubmerge said intakes as each traverses a dam to thereby maintain a supply of water to said pump at all times.

8. The construction of claim 7 and means on each water intake to close the same when raised out of the water.

9. The construction of claim 6 including means to supply water to the uppermost section of said ditch to a given height therein, and means to flow water from each section to the next successive lower section and to control the level of water in the latter.

10. The construction of claim 1 in which the closed loop of said reference line comprises a series of substantially straight courses with curved courses joining the same, said sprinkler arm extends outwardly from said reference line substantially perpendicular to the latter when traversing said straight courses and substantially radial to the center point for said curved courses when traversing the same, two sets of sprinkler heads provided on the sprinkler arm, and means responsive to the translation of said sprinkler arm to supply water to one set only during traverse of said straight courses by said sprinkler arm and to supply water to said second set only during traverse of said curved courses by said sprinkler arm.

11. The construction of claim 10 in which the speed of movement for a selected point near the center of said sprinkler arm remains substantially constant throughout the movement of said arm in traverse of both said straight and curved courses, one of said sets of sprinkler heads on said arm being constructed to provide a substantially constant rate of sprinkling per foot of said pipe outwardly from said selected point of constant speed and to provide a diminishing rate of sprinkling per foot of said pipe inwardly from said selected point corresponding to the need for uniform sprinkling of the area traversed by said inward position of said arm in said curved courses having regard to the lower ground speed for that portion of the arms during such traverse, a second of said sets of sprinkler heads disposed in the region inwardly of said selected point of constant speed to complement said first set of sprinkler heads in this region to provide a uniform rate of sprinkling for the area traversed inwardly of said selected point of constant speed along said straight courses, and a third set of sprinkler heads disposed in the region outwardly of said selected point of constant speed constructed to provide an additional and increasing rate of sprinkling per foot of said pipe outwardly from said selected point corresponding to the need for uniform sprinkling of the area traversed by said outward portion of said arm in said curved courses having regard to the higher ground speed for that portion of the arm during such traverse.

12. The construction of claim 11 in which said reference line constitutes a track, and said last named means comprises a dolly moved along said track in response to translation of said sprinkler arm, and interengaging means on said track and dolly responsive to the movement of said dolly along said track to select the alternate operation of said second and third sets of sprinkler heads.

13. The construction of claim 1 in which the closed loop of said reference line comprises a series of substantially straight courses with curved courses joining the same, said sprinkler arm extends outwardly from said reference line substantially perpendicular to the latter when traversing said straight courses and substantially radial to the center point for said curved courses when traversing the same, a plurality of sets of sprinkler heads provided for said sprinkler arm, and means responsive to the translation of said sprinkler arm along said reference line to selectively determine the supply of water to said sets from said pipe to obtain a substantially uniform application of water to the area of ground traversed by said arm throughout both said straight and curved courses.

14. The construction of claim 1 in which said reference line constitutes a track, and said last named means comprises a dolly moved along said track in response to translation of said sprinkler arm therealong, and monitoring means carried by said dolly for controlling the movement of said sprinkler arm.

15. The construction of claim 14 in which said dolly comprises a frame supported on said track, a platform mounted on said frame to turn relative thereto on a vertical axis, means securing said platform in fixed horizontal angular orientation relative to said sprinkler arm, and said monitoring means for responsive to relative turning movement between said platform and frame to institute correctional actuation of said tractor means to maintain the orientation of said sprinkler arm relative to said reference line within predetermined tolerance limits.

16. The construction of claim 14 in which said monitoring means comprises means sensing relative lateral movement between said sprinkler arm and said dolly, and means responsive to said sensing means to institute correctional actuation of said tractor means to maintain the later position of said sprinkler arm relative to said dolly and reference line.

* * * * *